July 8, 1941.  J. M. BILA  2,248,655
AUTOMOBILE COVER
Filed Nov. 4, 1940  3 Sheets-Sheet 1
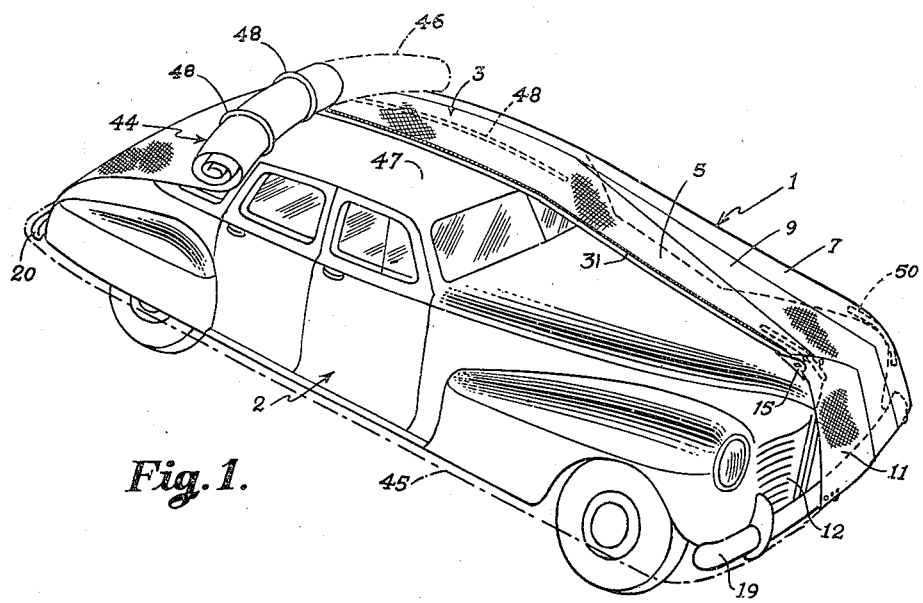
Fig. 1.
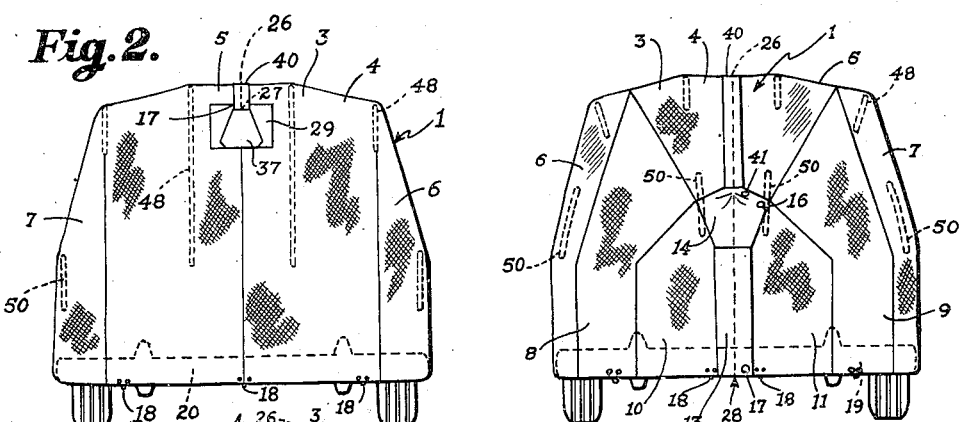
Fig. 2.  Fig. 3.  Fig. 4.
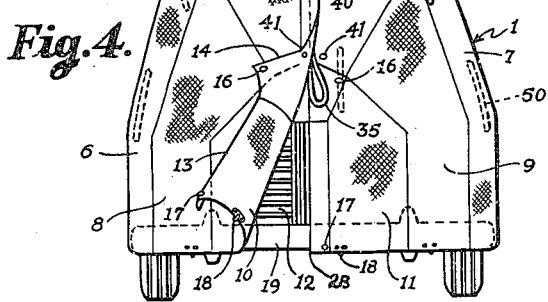
JOSEPH M. BILA
INVENTOR.
BY
ATTORNEY

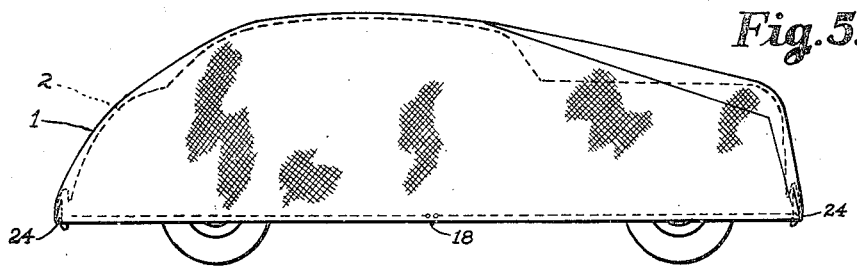
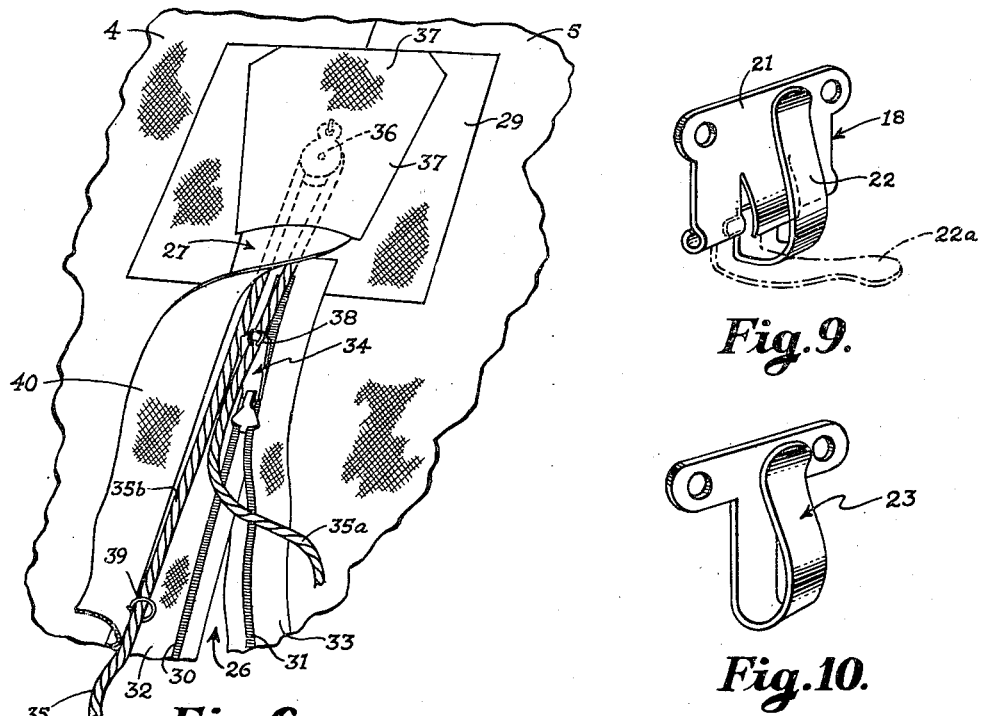
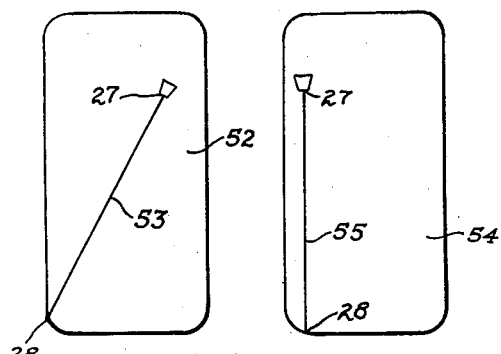

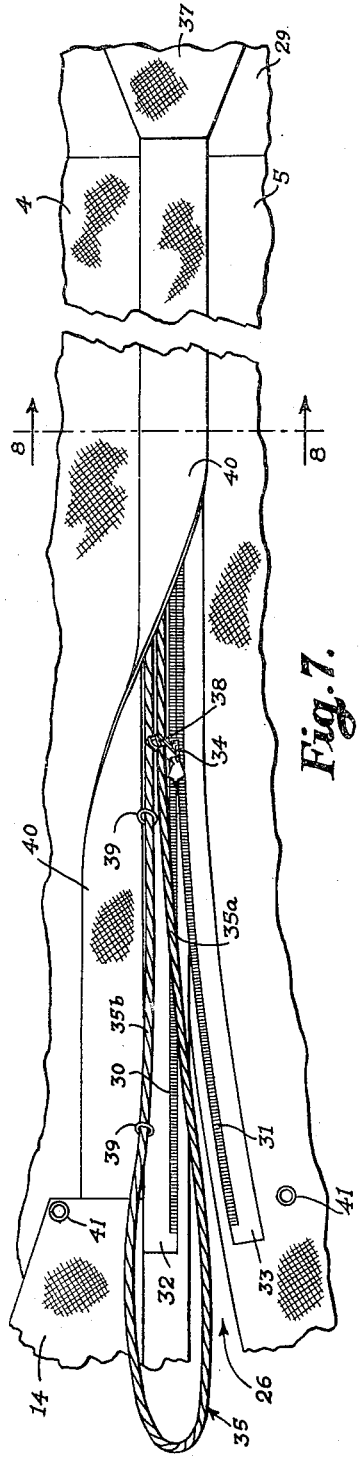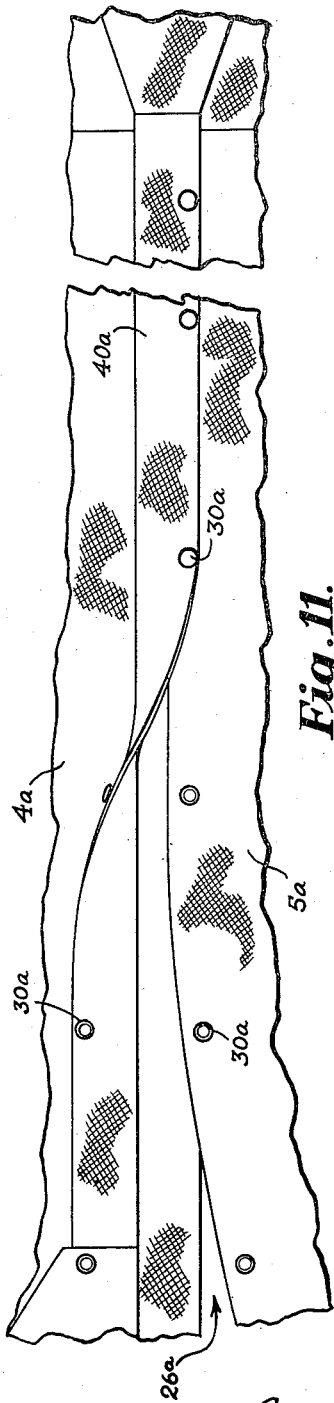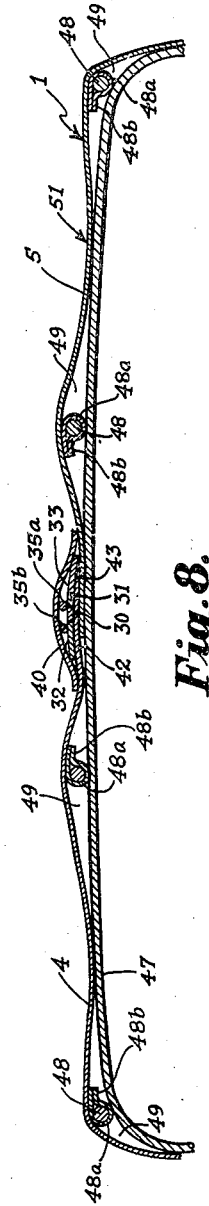

Patented July 8, 1941

2,248,655

UNITED STATES PATENT OFFICE 2,248,655

AUTOMOBILE COVER

Joseph M. Bila, Walnut Park, Calif.

Application November 4, 1940, Serial No. 364,121

15 Claims. (Cl. 135—5)

This invention relates to automobile covers of flexible material for protecting automobiles from dust or the weather.

The principal object of the invention is to provide an automobile cover that is easy to place on and remove from an automobile.

Another object of the invention is to provide an automobile cover with spacing means for minimizing contact of the cover with the automobile and providing ventilation whereby gathering of moisture or "sweating" is minimized.

A further object of the invention is to provide an automobile cover with fastening means which may be operated from one end of the automobile.

I accomplish these and other objects of my invention by providing an automobile cover of flexible material such as canvas which is adapted to cover and protect the body of the automobile and which is provided with a slit extending in a generally longitudinal direction, from a position intermediate its ends and adjacent one end of the automobile body when in position thereon, to the edge of the cover at the other end of the body. This slit completely divides the cover between the intermediate position and the edge and is provided with separable fastening means which are adapted to secure together the portions of the cover at the opposite sides of the slit to close it.

The cover is adapted to rest upon and completely enclose the body of the automobile at the ends and sides thereof. In its preferred form the cover is provided with longitudinally extending spacing members which are adapted to engage at spaced positions the surfaces of the automobile body to hold the cover away from these surfaces and provide ventilation between the cover and the surfaces.

The cover may be described as having a longitudinally extending medial portion which is adapted to extend over the upper surfaces and the ends of the body, and lateral portions adapted to extend over the sides of the body. The several portions of the cover are preferably permanently secured together, as by stitching, so as to provide a "one-piece" cover for the entire body, although of course the cover or the several portions are conveniently formed of a plurality of separately cut pieces of material secured together by stitching or otherwise. The above-mentioned slit is preferably provided in the medial portion and most preferably extends centrally thereof in the direction of the longitudinal axis of the body from a position adjacent the back end of the top of the body to the front edge of the cover.

In its preferred form the cover is provided with slide fastening means comprising rows of interlocking members extending along the major portion of the length of the slit and located at the opposite sides of the slit, and means operable from the front end of the automobile, such as a rope connected to the operating slide of the fastening means, is provided for engaging and disengaging the interlocking members to close and open the major portion of the slit.

Further objects and advantages of the invention will either be specifically brought out in the following description or will be apparent therefrom.

I have illustrated my invention in the accompanying drawings and referring thereto:

Fig. 1 is a perspective view of an automobile showing the preferred form of cover of my invention partly in place thereon;

Fig. 2 is an end elevation thereof taken from the rear of the automobile with the cover in place;

Fig. 3 is a front elevation thereof taken from the front of the automobile with the cover completely in place;

Fig. 4 is a view taken in the same manner as Fig. 3 with a portion of the front of the cover rolled back to illustrate the construction;

Fig. 5 is a side elevation of the cover in place on the car;

Fig. 6 is a perspective detail showing the construction of the cover at the inner end of the slit and illustrating the preferred form of the fastener operating mechanism;

Fig. 7 is a top plan view of the central portion of the cover with parts rolled back to illustrate the relation of the various parts;

Fig. 8 is a partly diagrammatic sectional view taken in a position indicated by the line 8—8 in Fig. 7 and illustrating the spacing means and the preferred form of overlapping construction provided when the slit is closed;

Fig. 9 is a perspective view of a preferred form of fastener for holding the cover to the automobile bumper;

Fig. 10 is a perspective view of a modified form of fastener;

Fig. 11 is a view taken at a position corresponding to that of Fig. 7 and illustrates the use of snap fasteners for closing the slit; and Figs. 12 and 13 are diagrammatic plan views illustrating alternative locations of the slit.

Referring to Figs. 1–10 of the drawings, and more particularly to Figs. 1–5, my invention is shown as comprising a cover 1 of flexible material such as canvas or other dust-impervious and preferably water-impervious material such as a light waterproofed fabric or rubberized fabric, which is made up of a plurality of pieces of canvas or the like suitably shaped and stitched together so as to cover and protect the body of an automobile such as indicated at 2. The automobile body, as referred to herein, will be understood to include the hood and fenders, and will also be understood generally to include other projecting parts or accessories which are to be covered, such as the bumpers, lamps, and license plates. The cover is shown as comprising a longitudinally extending medial portion 3 which is adapted to extend over the upper surfaces and the ends of the body, and left and right lateral portions or panels 6 and 7 which are suitably secured to the medial portion and extend over the sides of the car body. In this particular instance the medial portion 3 comprises right panels 4, 8, and 10, and left panels 5, 9, and 11. Obviously, more or fewer panels may be used.

The plurality of panels making up the cover 1 are preferably shaped and fitted so that the cover rests on the car, that is, on the top and on the forward portions, and extends from bumper to bumper and fits the car snugly. The cover is spaced from the car from a position adjacent the windshield to the front of the hood and at other positions, as for example at the points where the fenders meet the body in fairly sharp curves, since it is not necessary that the cover contact the body at all positions, and since it is preferable to have the cover spaced from the body in order to increase ventilation, as will be brought out subsequently.

The cover is preferably provided with a plurality of fastening means located at spaced positions along its edge at each end thereof, for securing the front and rear edges of the cover to suitable parts of the automobile body covered thereby as indicated in Figs. 2 and 3. For example, these fastening means may be of the type shown in Fig. 9 and may be adapted to engage the bottom edges of the front and rear bumpers indicated at 19 and 20 respectively to hold the front and rear portions of the cover to the bumpers and maintain the whole cover in position on the automobile. One or more fastenings may also be provided along each side of the cover to hold it to the side of the car as indicated at 18 in Fig. 5. The fastening means at the ends of the cover are of particular advantage in preventing longitudinal movement of the cover during the operation of slide fastening means for closing the slit in the cover as hereinafter described.

I prefer to use a fastening means such as illustrated in Fig. 9, which is shown as comprising a base plate 21 which is secured to the cover by riveting or sewing, and is provided with a hook 22 which is hinged to the plate 21 and is movable to an open position such as indicated in dot-dash lines at 22a. This type of fastening means is comparable to the type ordinarily used on raincoats and is spring-biased to either its closed position as indicated at 22 or its open position as indicated at 22a. Thus with the cover in position it is a simple matter to open the hooks and place them beneath the lower edge of the bumper and then spring the hooks back into the closed position as indicated at 22.

It is not necessary to use a hinged hook such as shown in Fig. 9 and I may use a spring hook such as illustrated at 23 in Fig. 10. Since the cover is made of flexible material and is of considerable extent, it is usually possible to stretch the cover sufficiently to engage the spring hooks 23 with the lower edge of the bumpers or underside of the body. Obviously, any one of a number of readily available fastening means may be substituted for the ones illustrated in Figs. 9 and 10. The hooks 22 or 23 or other fastening means employed for this purpose may be provided with coverings of rubber or other non-metallic material to prevent injury to the car body.

It is preferable that the cover extend slightly beneath the bumpers at their ends in order to more surely engage them, and for that reason I prefer to provide tucks in the corners of the cover. The tucks at the front and rear corners of the cover are indicated at 24 in Fig. 5.

To facilitate putting on and removing the cover, it is provided with a longitudinally extending slit, as indicated diagrammatically by the dotted line 26, which extends from a position intermediate its ends as at 27, and adjacent one end of the top of the body when the cover is in position thereon, to the front edge of the cover at the end of the body as at 28, to completely divide the cover from the position at 27 to the edge at 28. For convenience, the slit extends substantially along the boundary between the left medial panels 4 and 10 and the right medial panels 5 and 11. Suitable means is preferably provided for strengthening the cover at the end of the slit 26 to prevent the cover from splitting. Such strengthening may be provided by a rectangular patch 29 of canvas or the like which is suitably stitched or otherwise secured to the medial panels 4 and 5, as shown in Figs. 2, 6, and 7.

The cover is further provided with separable fastening means which are adapted to secure together the portions of the cover on opposite sides of the slit to close the slit. Referring particularly to Figs. 6 and 7, a preferred form of fastening means is shown as comprising cooperating engageable slide fastener tracks 30 and 31 extending from the rear end of the slit to a position adjacent the forward end of the car, for example to the front end of the top of the hood adjacent the customary radiator ornament. Each of said fastener tracks comprises a row of interlocking members carried by their respective tapes 32 and 33 which are secured to the opposite sides of the slit 26 and in this case to the medial panels 4 and 5 respectively. An operating slide is indicated at 34 and is adapted upon longitudinal movement with respect to the fastener tracks to cause their engagement or disengagement, in the well-known manner of operation of slide fastening means such as shown for example in Sundback Patent No. 1,557,381 of October 13, 1925.

The panel 10 is preferably provided with a vertically extending panel portion 13, which is adapted to partially overlap the panel 11, and with an upper panel portion 14 which is adapted to partially overlap the upper portion of the panel 11 and to accommodate the customary radiator ornament such as indicated at 15. Suitable fastening means such as cooperating snap fasteners 16 and 17 which are well known in the art are provided for holding the panels 10 and 11 together in this overlapping relation to complete the closing of slit 26.

A particular feature of this invention resides in the provision of operating means for opening or closing the slit from the front of the car. A rope or cord loop 35 is shown passed through a pulley 36 which is located adjacent the end 27 of the slit and is suitably secured to the cover as to the reinforcing member 29. A protective cover 37 is preferably provided over the pulley and may be secured to the reinforcement 29. The rope 35 is shown in Figs. 4, 6, 7, and 8.

The slide 34 is shown suitably attached to the operating side 35a of the rope loop 35 as by stitching 38. Suitable means, such as rings 39, is provided for slidably supporting and guiding the return side 35b of the rope loop on the cover. The rings 39 are conveniently attached to a flap 40 carried by the panel 4 and adapted to cover the rope and the fasteners when the cover is in position as indicated in Fig. 8, for example, and as partially indicated in Fig. 7. Panel 40 is secured at its forward end to the upper edge of the overlapping panel portion 14. When the cover is fastened in position, as illustrated in Fig. 3 for example, the flap is held securely closed by the separable fastening means 16 and 17 and also by separable fastening means such as snap-fasteners 41 located adjacent the end of the flap, as illustrated in Figs. 3, 4, and 7.

The inner marginal portions 42 and 43 of the panels 4 and 5 respectively, along the edges of the slit, preferably overlap somewhat, as indicated in Fig. 8, and preferably extend beyond the edges of the fastener tracks 30 and 31 so as to protect the top of the car and prevent the metal fasteners from coming in contact therewith.

It is to be understood that although I have only shown the slide fasteners extending from adjacent the rear of the slit along the major portion of the length of the slit to adjacent the radiator ornament 15, they may be extended to the edge of the slit. However, this is not necessary since the front edge of the cover is readily accessible and snap fasteners are easily operated at that position and are less expensive. The portion of the cover between the radiator and rear end of the slit is relatively inaccessible and the use of slide fasteners along this portion of the cover presents a real advantage.

The cover is removed from the car by releasing the fastening means 18 from the front bumper and folding the front panel 10 back as indicated in Fig. 4 to expose the rope 35. The fastener slide 34 is then operated by the rope 35 to move it toward the end 27 of the slit to open it. One side of the cover, for example the left side, is then rolled back over the car to a position opposite the end 27 of the slit as indicated at 44 in Fig. 1. The outline of the cover before the rolling is begun is indicated by the dot-dash lines at 45 in Fig. 1. Before beginning the rolling operation it is preferable to lift the front corner of the cover and fold the cover to bring this corner in juxtaposition with the front cover portion 14. The above folding and rolling operation is repeated with the right-hand portion of the cover to bring it to a position such as indicated by the roll outlined in dot-dash lines at 46. The rear portion of the cover is then released from the rear bumper 20 as by operation of the rear fastening means 18 and the rear portion is preferably rolled up to meet the rolls made of the front portions. The cover can then be removed from the car and folded into a neat and compact bundle. To place the cover in position on the car the above process is reversed. Obviously the task may be readily performed by one man.

It is pointed out that a partially split cover as described herein provides other advantages besides that of ease of handling. For example, when the cover is in the position indicated in Fig. 1, access to the car may be had without removing the whole cover. Furthermore, when the cover is as shown in Fig. 1 the car may be used as a part of a shelter for camping.

Although I prefer to use a fastening means which may be operated from one end of the car such as the front for securing the sides of the slit together, it is obvious that other forms of fastening means may be used for this purpose. For example, snap fasteners may be used, with a consequent decrease in the ease of operation of the device. Referring to Fig. 11, a portion of a cover comprising medial panels 4a and 5a, corresponding to the panels 4 and 5 illustrated in Fig. 7, is shown provided with cooperating snap fasteners 30a located on opposite sides of the slit 26a and adapted to close the slit. One set of the fasteners 30a is carried by the panel 5a and the other set is carried by a flap 40a secured to the panel 4a.

A particular feature of this invention is the provision of means for spacing the cover from the body of the car to provide ventilation and prevent "sweating." This feature may be employed independently of the particular preferred form of divided cover claimed herein. Referring to Fig. 8, a sectional portion of the car top is indicated diagrammatically at 47, and the cover 1 is shown in place thereon. Suitable spacing means, such as longitudinally extending spacing members 48 are shown suitably secured to the underside of the cover member and in contact with the upper surface of the top 47. The spacing members may comprise cotton rope or rubber or other suitable flexible material capable of withstanding the load of the cover without marring the surface of the top. The spacing members 48 are preferably enclosed in a fabric tube 48a having an external seam 48b which is conveniently stitched or otherwise secured to the underside of the cover.

The spacing members 48 hold the cover away from the top to provide ventilation channels 49 which allow the circulation of air between the cover and the top. Spacing means are preferably provided at other positions along the cover at which the cover would normally contact the automobile body. For example, they may be provided as at 50 where the cover touches the fenders and hood, as illustrated in Figs. 1-4. Obviously the cover will touch the surfaces of the automobile body at positions between the spacing means, as indicated at 51 in Fig. 8. However, if the cover is well tailored and tightly stretched according to the contemplation of this invention, these points of contact will be of small area and the circulation will generally be sufficient to prevent sweating due to moisture condensation from the air which is generally trapped beneath a cover.

With present automobile styles the largest uninterrupted surface of the body is adjacent the back of the top and for that reason the slit generally extends from the front of the cover to a position adjacent the back of the top. Obviously, as automobile styles change and the so-called "tear-drop" design is approached it may be more convenient to provide the slit running from the back of the cover to a position adjacent the upper surface of the front of the car. The location of the inner end of the slit is determined by the most convenient place to rest the cover during the process of putting it on or taking it off of a car.

I find it most convenient to provide the slit along the center of the cover as illustrated in Figs. 1-4. However, the slit may be provided in other locations, generally with a sacrifice in operating efficiency. For example, as illustrated diagrammatically in Fig. 12, a cover 52 may be provided with a slit 53 which runs diagonally from one edge to a position intermediate the ends of the cover. As another example, in Fig. 13 I have diagrammatically illustrated a cover 54 having a slit 55 which extends generally parallel to the slit 26 of Figs. 1-4 but is located closer to one side of the cover than the other. In any event, for best results the slit should extend generally along the medial portion of the cover.

Having now described and illustrated particular forms of my invention, I wish it to be understood that my invention is not to be limited to the specific forms or arrangements of parts herein described and shown, except insofar as such limitations are specified in the appended claims.

I claim:

1. A removable protective cover for an automobile, fashioned from a flexible material and adapted to rest upon and completely cover the automobile and to substantially completely enclose the body of the automobile at the ends and sides thereof, said cover being provided with a slit extending in a generally longitudinal direction from a position intermediate the ends of the cover and adjacent one end of the top of the body when in position thereon to the edge of the cover at the other end of said body to completely divide the cover from said intermediate position to said edge; separable fastening means adapted to secure together the portions of the cover at the opposite sides of said slit to close the slit, said separable fastening means including slide fastening means extending along the major portion of said slit; and means for operating said slide fastening means from said one end of said cover.

2. A cover as set forth in claim 1, and additionally comprising a plurality of fastening means located at spaced positions along the edge of said cover at each end of said cover for engaging the automobile body to hold the cover in place on the body.

3. A removable protective cover for an automobile, fashioned from a flexible material and adapted to rest upon and completely cover the automobile and to substantially completely enclose the body of said automobile at the ends and sides thereof, said cover having a longitudinally extending medial portion adapted to extend over the upper surface and ends of said body and lateral portions adapted to extend over the sides of said body, said medial portion having a slit extending along the major portion of its length in a generally longitudinal direction from a position intermediate its ends to the edge thereof at one end to completely divide the portion of said cover at the opposite sides of said slit from said intermediate position to said one end, said cover being provided with cooperating separable fastening means located on opposite sides of said slit for securing together the portions of the cover at the opposite sides of said slit.

4. A cover as set forth in claim 3, additionally comprising a plurality of fastening means located at spaced positions along the edge of said cover for engaging the automobile to hold the cover in place thereon.

5. A cover as set forth in claim 3, and including in addition longitudinally extending, laterally spaced spacing members located on the underside of said cover for spacing said cover from the automobile body.

6. A cover as set forth in claim 3, said cooperating fastening means including slide fastener means provided with a slide, and means for operating said slide from said one end of said cover, said slide fastener means extending along the major portion of said slit and having one end adjacent said intermediate portion.

7. The combination with a removable flexible protective cover for an automobile, of spacing means carried on the underside of said cover for holding the cover away from the automobile at spaced positions and providing ventilation ducts between the cover and the automobile.

8. A removable protective cover for an automobile, fashioned from a flexible material and adapted to rest upon and completely cover the automobile and to substantially completely enclose the body of said automobile at the ends and sides thereof, said cover having a longitudinally extending medial portion adapted to extend over the upper surface and ends of said body and lateral portions adapted to extend over the sides of said body, said medial portion having a slit extending substantially centrally and in a longitudinal direction from the front edge of the cover to a position adjacent the rear of the top of the body when the cover is in position thereon to completely divide said cover at the opposite sides of said slit from said edge to said position, said cover being provided with cooperating separable fastening means located on opposite sides of said slit for securing together the portions of the cover at the opposite sides of the slit, said fastening means including slide fastening means comprising slide fastener tracks each comprising a row of interlocking members extending along the major portion of the slit on the opposite sides of the slit and a longitudinally movable slide for operating said fastener means to close said major portion of the slit, said cover further being provided with operating means for operating said slide from a position adjacent the front of the automobile.

9. A cover as set forth in claim 8, additionally comprising a plurality of fastening means located at spaced positions along the edge of said cover for engaging the automobile to hold the cover in place thereon.

10. A cover as set forth in claim 8, and additionally comprising a plurality of fastening means located at spaced positions along the edge of said cover at each end of said cover for engaging the automobile body to hold the cover in place on the body.

11. A cover as set forth in claim 8, said operating means including pulley means located rearwardly of said slit, a rope loop passed through said pulley means and extending to a position at the forward end of said cover, said loop having an operating side and a return side, said operating side being attached to said slide, and guide means secured to said cover for slidably engaging and guiding the return side of said rope.

12. A cover as set forth in claim 8, and including in addition longitudinally extending, laterally spaced spacing members located on the underside of said cover for spacing said cover from the automobile body.

13. A cover as set forth in claim 8, the portions of said cover at said slit overlapping when said slit is closed by said fastening means.

14. A cover as set forth in claim 8, said operating means including pulley means located rearwardly of said slit, a rope loop passed through said pulley means and extending to a position at the forward end of said cover, said loop having an operating side and a return side, said operating side being attached to said slide, guide means secured to said cover for slidably engaging and guiding the return side of said rope, and a plurality of fastening means located at spaced positions along the edge of said cover at each end thereof for engaging the automobile body.

15. The combination with a removable flexible cover for an automobile, of a plurality of flexible longitudinally extending spacing members secured to the underside of said cover at laterally spaced positions for contacting the automobile to hold the cover away from the automobile and provide ventilation ducts between the cover and the automobile.

JOSEPH M. BILA.